United States Patent [19]

Pape et al.

[11] Patent Number: 5,267,934
[45] Date of Patent: Dec. 7, 1993

[54] CARTON POUR SPOUT FITMENT APPLICATOR

[75] Inventors: Leslie Pape, New Hudson; Barry C. Owen, Southfield, both of Mich.

[73] Assignee: Elopak Systems A.G., Glattbrugg, Switzerland

[21] Appl. No.: 45,347

[22] Filed: Apr. 12, 1993

[51] Int. Cl.⁵ .............................. B31B 1/84
[52] U.S. Cl. ....................... 493/87; 53/133.2
[58] Field of Search .............. 493/87, 102, 114, 901, 493/213; 53/133.2, 133.3, 133.4

[56] References Cited

U.S. PATENT DOCUMENTS

| 4,386,923 | 6/1983 | Okushita | 493/87 |
| 4,456,118 | 6/1984 | Kauffman et al. | 198/480 |
| 4,788,811 | 12/1988 | Kawajiri et al. | 53/426 |

FOREIGN PATENT DOCUMENTS 2238287 5/1991 United Kingdom .

Primary Examiner—Jack Lavinder
Attorney, Agent, or Firm—Reising, Ethington, Barnard, Perry & Milton

[57] ABSTRACT

A pour spout fitment applicator adaptable to applying a flanged pour spout fitment through an opening in a carton top panel. The applicator includes a rotatable shaft having an anvil secured thereto, a vacuum cup mounted on the distal end of the anvil, and a cam controlled pivotable chute segment for coordinating the supplying of one fitment at a time to the vacuum cup. A linkage and toggle system serves to rotate the anvil and the cam so as to insert the individual fitment directly into the opening. While backed up by the anvil, the flange of the fitment is sealed by an ultrasonic sealer and horn to the inner surface of the top panel around the opening. The applicator operates transversely to the path of movement along a conveyor. As such, two or more applicators may simultaneously apply fitments to closely adjacent cartons.

12 Claims, 3 Drawing Sheets

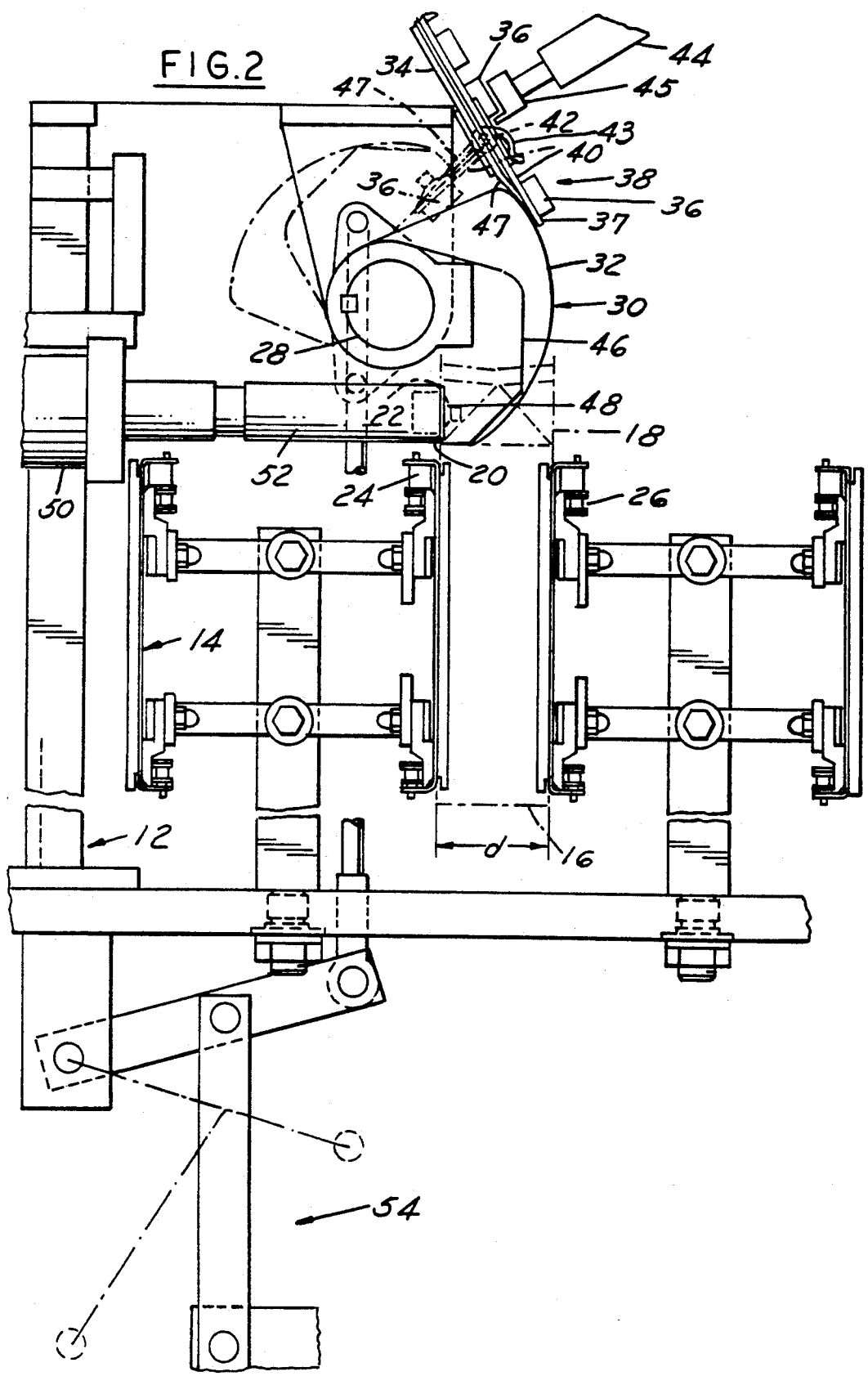

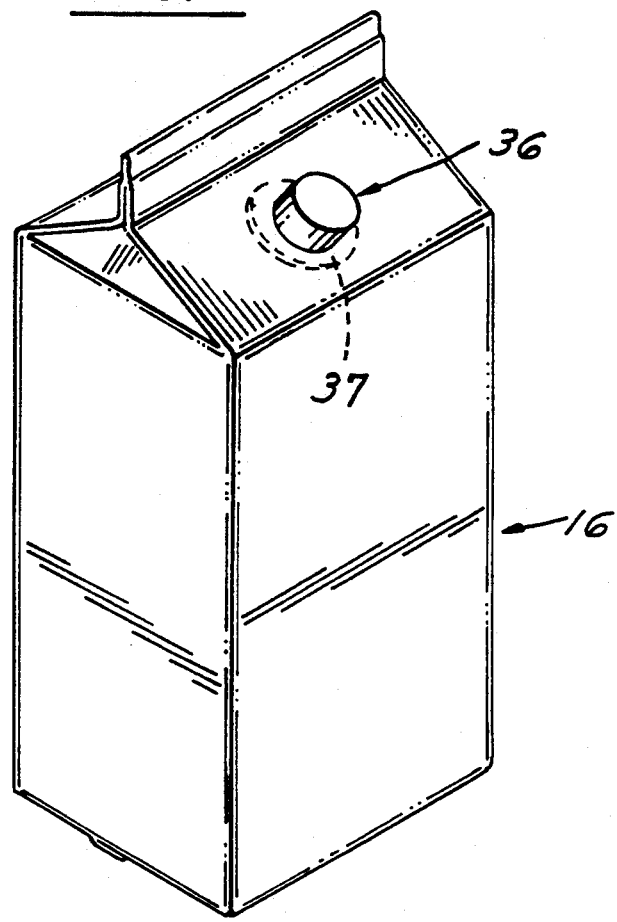
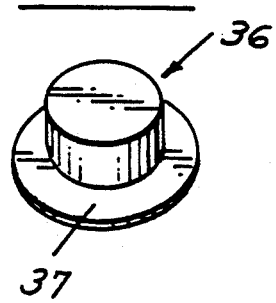
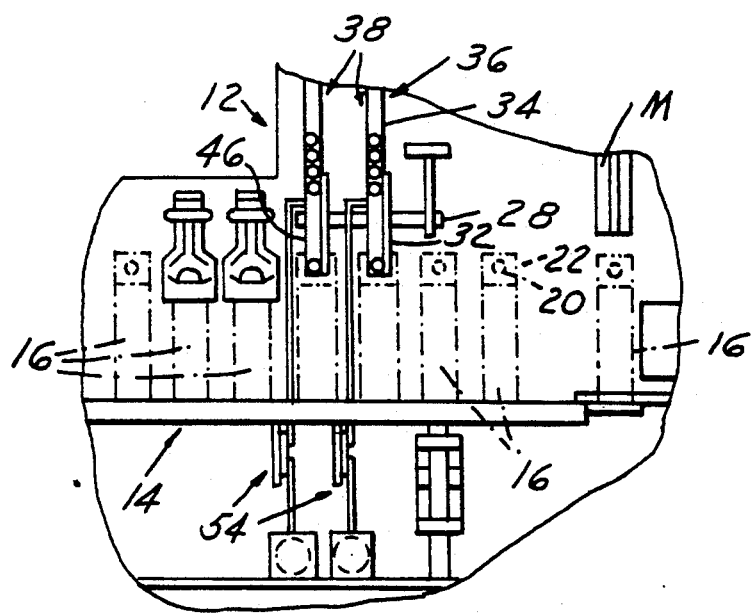

CARTON POUR SPOUT FITMENT APPLICATOR

FIELD OF THE INVENTION

This invention relates generally to carton forming, filling and sealing machines and, more particularly, to such machines which are adapted to apply pour spout fitments while the cartons are being processed thereon.

BACKGROUND ART

Forming, filling and sealing machines having pour spout applicators at one of the stations therealong are known. For example, British Pape patent no. GB 2,238,287 discloses an application station at which a rotatable mandrel or bar is provided, with the mandrel having a boss projecting therefrom. A pouring spout is placed on the boss by external means; as the carton is indexed into the application station, the mandrel is rotated in the direction of the carton travel into the open top of each carton, aligning the boss with an opening formed in a selected panel of the top closure of the carton; the boss and pouring spout are moved laterally through the opening; the inner flanged end of the pouring spout is secured, such as by ultrasonic welding, to the inner wall around the opening; and the boss is withdrawn from the opening and then rotated out of the open top. An outer cap is attached to the pouring spout before assembly.

Other pouring spout applicators are disclosed in Kawajiri U.S. Pat. No. 4,788,811 and Okushita U.S. Pat. No. 4,386,923. Kawajiri discloses a horizontally elongated pour spout fitment attaching turret at a location upstream of the usual turret and radial mandrels on which the bottom end closure is folded and sealed. The fitment attaching turret includes a pusher at one station for pushing an open-ended package onto a sucker device holding and inserting a pour spout fitment into an opening in a package top panel. The fitment attaching turret is then rotated to a second station where an anvil is axially inserted into the package, cooperable with an ultrasonic horn for sealing a flange of the fitment to the inner surface of the top panel.

Okushita discloses a bag-in-box arrangement wherein a fitment is attached to the bag which is then inserted through a hole in flap of the box, while both are in the collapsed or blank state.

DISCLOSURE OF THE INVENTION

A general object of this invention is to provide an improved carton pour spout fitment applicator for use on a carton forming, filling and sealing machine.

Another object of the invention is to provide an improved carton pour spout fitment applicator adaptable to applying the pour spout fitments to cartons while the cartons are being conveyed by a conveyor, or similar transporting means, wherein aligned cartons are closely arrayed.

A further object of the invention is to provide an improved pour spout fitment applicator adaptable to applying the pour spout fitment through an existing opening in an upper closure panel of a carton from the inside thereof, and sealing same to the inside surface thereof.

Still another object of the invention is to provide a pour spout fitment applicator adaptable to applying a flanged pour spout fitment through an opening in a carton top panel, including a rotatable shaft having an anvil secured thereto, a vacuum cup mounted on the distal end of the anvil, and a cam controlled pivotable chute segment for coordinating the supplying of one fitment at a time to the vacuum cup, a linkage and toggle system for rotating the anvil so as to insert the associated fitment into the opening, and, while backed up by the anvil, an ultrasonic sealer and horn for sealing the flange of the fitment to the inner surface of the top panel around the opening.

These and other object and advantages of the invention will become more apparent when reference is made to the following drawings and the accompanying description.

BRIEF DESCRIPTION OF THE DRAWINGS

FIG. 1 is an enlarged side elevational view of the inventive pour spout fitment applicator portion of FIG. 1, taken along the plane of the line 2—2, and looking in the direction of the arrows;

FIG. 3 is a perspective view of a pour spout fitment embodied in the invention;

FIG. 4 is a perspective view of the finished carton product; and

FIG. 5 is a fragmentary side elevational view of a double indexing forming, filling and sealing machine embodying the invention.

BEST MODE OF CARRYING OUT THE INVENTION

Figure 1:
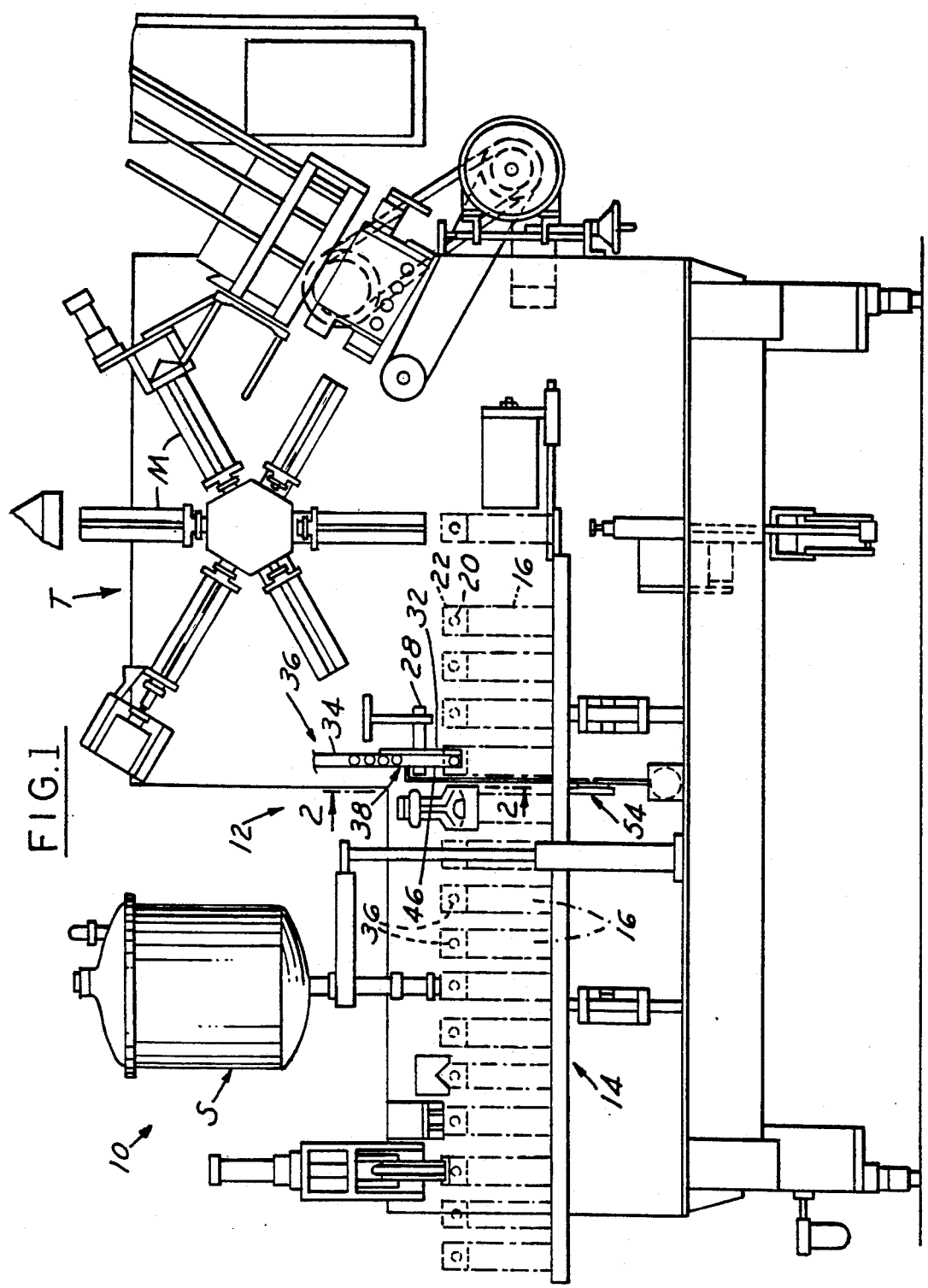
FIG. 1 is a side elevational view of a forming, filling and sealing machine embodying the invention.

Referring now to the drawings in greater detail, FIG. 1 and 2 illustrate a forming, filling and sealing machine 10 embodying a pour spout fitment applicator 12, and including a conveyor 14 carrying thermoplastic coated cartons 16 having open-topped upper end closures 18. An opening 20 is formed in one panel 22 of each end closure 18. The applicator 12 is mounted on the machine 10 intermediate the usual indexable turret mechanism T including a plurality of mandrels M and the source S of a selected liquid.

As shown in FIG. 2, the conveyor 14 comprises two endless chains 24 and 26 spaced a predetermined distance d apart, within which a series of closely spaced apart cartons 16 are carried, with the panel 22 bearing the opening 20 facing toward one of the chains 24.

The pour spout fitment applicator 12 includes a rotatable shaft 28 having a narrow cam 30 secured thereto. The cam 30 includes an outer arcuate surface 32. A chute 34 extends downwardly at a predetermined angle above the applicator 12. The chute 34 is adapted to hold a row of pour spout fitments 36 with flanges 37 thereon slidably aligned therein, as received from external loading means, such as a vibratory parts feeder (not shown), available from Syntron Co., Homer City, Pa. Such a parts feeder automatically orients a load of fitments 36 and feeds them in their oriented attitude to the chute 34.

An escapement device 38 includes a segment 40 pivotally connected by a pivot pin 42 to the distal end of the chute 34. A spring 43 mounted around the pivot pin 42 urges the segment 40 toward a clockwise direction about the pivot pin while the line-up of fitments 36 is retained in the chute 34. The escapement device 38 also includes any suitable release mechanism, such as a cylinder 44 and associated stop member 45, adapted to release one fitment 36 into the segment 40 each time the segment is returned to an aligned relationship with the chute 34, as will be explained. A retaining clip 47 holds a fitment 36 loosely in the segment 40.

An anvil 46 is also secured to the shaft 28 adjacent the cam 30. A vacuum cup 48 is mounted on the end portion of the anvil 46.

An ultrasonic sealer 50 includes a retractable horn 52 having an axis aligned with the opening 20 in the panel 22.

A typical linkage and toggle system, represented as 54, is operatively connected to the shaft 28, serving to reciprocally rotate same in unison with the indexing of the cartons 16 by the conveyor 14.

In operation, as a carton 16 begins to index into position below the applicator 12, the linkage and toggle system 54 rotates the shaft 28 in a counterclockwise direction in FIG. 2, thereby rotating the anvil 46 and the cam 30 out of the carton path and such that the surface 32 is rotated past the segment 40. Once the distal end of the cam 30 moves past the segment 40, the spring 43 pivots the segment from the position shown in solid lines in FIG. 2 to the position shown in phantom. Once in the latter position, the vacuum cup 48 on the end portion of the anvil 46 engages and receives the fitment 36 from the segment 40.

As the system 54 causes the cam 30 and anvil 46 to next rotate in a clockwise direction, the surface 32 urges the segment 40 against the force of the spring 43 back to the solid line position of FIG. 2. The escapement device 38 now permits the next in line fitment 36 to drop into loading position in the segment.

Concurrently, the anvil 46 and vacuum cup 48 rotate the fitment 36 into the open top of the now indexed carton, as shown in FIG. 2, to thereby project the fitment outwardly through the opening 20, and engaging the flange 37 against the inner surface of the panel 22 around the opening. While the anvil is in position behind the fitment 36, the ultrasonic sealer 50 and retractable horn 52 move to the right in FIG. 2, into contact with the outer surface of the panel 22 around the portion of the fitment 36 extended therethrough, where it serves to weld the flange 37 of the fitment to the inner surface of the panel 22, after which the horn retracts.

The cam 30 and anvil 46 are then rotated by the system 54 out of the open top closure 18 for the next cycle, and the cartons 16 are indexed forward toward the usual filling and top sealing stations of the forming, filling and sealing machine 10.

As shown in FIG. 5, due to the applicator 12 operating transversely to the path of movement of the cartons through the machine 10, the above described elements and their operations may be duplicated for simultaneously applying fitments to adjacent cartons on a double indexing machine along a single lane, that disclosed in Kauffman et al U.S. Pat. No. 4,456,118.

INDUSTRIAL APPLICABILITY

It should be apparent that the invention provides an improved carton pour spout fitment applicator that is cooperable with an indexing conveyor of a high production forming, filling and sealing machine.

It should be further apparent that the invention is such that, for a machine which indexes closely arrayed cartons two or more at a time along one path, multiple applicators may be employed side-by-side to accommodate closely adjacent cartons. For such a machine, there would be dual or other multiple turrets or mandrels, or one turret and a single to dual indexing carton transfer mechanism, as disclosed in the above referenced U.S. Pat. No. 4,456,118, and downstream multiple breakers, fillers, and sealers.

While two embodiments of the invention have been shown and described, other modifications thereof are possible within the scope of the following claims.

What is claimed is:

1. An applicator for applying a pour spout fitment to an opening of one panel of an open topped carton, the applicator including a rotatable shaft, an anvil secured at one end thereof to said shaft, means for holding a fitment adjacent the other end of said anvil, means for supplying a fitment to said other end of said anvil, means for sealing said fitment in said opening, characterized by means for rotating said shaft and causing said anvil to enter said open topped carton so as to directly insert said fitment into said opening.

2. The applicator described in claim 1, wherein said means for holding said fitment is a vacuum cup connected to said other end of said anvil.

3. The applicator described in claim 1, wherein said means for supplying a fitment to said anvil includes a chute filled with aligned fitments, a pivotable end segment of said chute adapted to receive one fitment at a time from said chute, spring means for urging said end segment toward said means for holding a fitment, and an arcuate shaped cam secured to said shaft adapted to return said end segment to alignment with said chute against the force of said spring means while said anvil is being rotated into said open topped carton.

4. The applicator described in claim 3, wherein said cam and said anvil are secured side-by-side on said shaft such that their free end portions enter and leave said open topped carton together.

5. The applicator described in claim 1, wherein said means for rotating said shaft is a linkage and toggle system.

6. The applicator described in claim 1, wherein said fitment includes a flange which engages the inner surface of said one panel around said opening.

7. The applicator described in claim 6, wherein said means for sealing said fitment in said opening is an ultrasonic sealer and retractable horn adapted to engage the outer surface of said one panel while the anvil is in place behind the fitment to thus weld said flange to said inner surface.

8. The applicator described in claim 1, and a conveyor for indexing said carton into position beneath said anvil.

9. The applicator described in claim 8, wherein said means for rotating said shaft and causing said anvil to enter said open topped carton so as to directly insert said fitment into said opening operates transversely to the path of movement of the carton along said conveyor.

10. An applicator for applying pour spout fitments received from an inclined chute to cartons being indexed by transporting means, with the cartons including a plurality of open top closure panels, one panel of which is provided with an opening therethrough, the applicator including an end segment pivotally mounted at the end of the chute and adapted to receive one fitment at a time from the chute, resilient means for pivoting said end segment, a rotatable shaft, a cam and an anvil secured to the shaft, a vacuum cup mounted on the end portion of said anvil, sealing means for securing one fitment in said opening, characterized by actuator means for reciprocally rotating said shaft so as to permit one fitment to be engaged by said vacuum cup prior to rotating said anvil into the open top closure panels to directly insert the one fitment into said opening, and then on the return stroke to rotate said anvil axially away from said opening and out of the open top closure panels.

11. Multiple side-by-side applicators for simultaneously applying multiple pour spout fitments to respective openings of each common panels of multiple open topped cartons, the applicators each including a rotatable shaft, an anvil secured at one end thereof to said shaft, means for holding a fitment adjacent the other end of said anvil, and means for supplying a fitment to said other end of said anvil, a conveyor for indexing said cartons along one lane into position beneath the respective anvils, and means for sealing said fitment in said opening, characterized by means for rotating each said shaft and causing each said anvil to enter said respective open topped cartons transversely to the path of movement of said cartons on said conveyor to insert said fitments into said respective openings.

12. The multiple side-by-side applicators described in claim 11, wherein said applicators are closely adjacent to one another, adaptable to simultaneously applying fitments to closely adjacent aligned cartons.

* * * * *